Aug. 21, 1962   F. E. SIMPSON ET AL   3,050,346
COMBINED SEAL AND THRUST MEANS
Filed Jan. 24, 1961   2 Sheets-Sheet 1
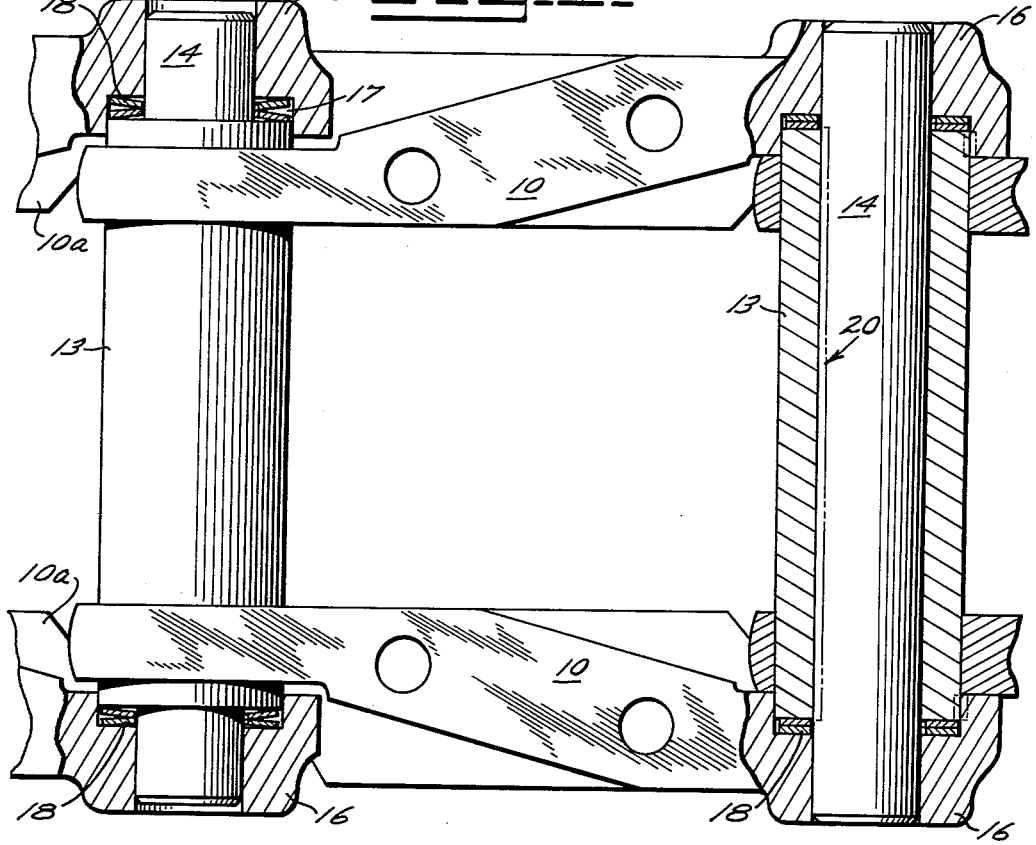
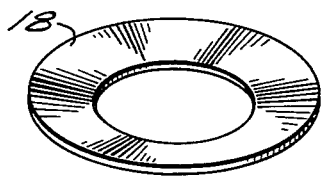
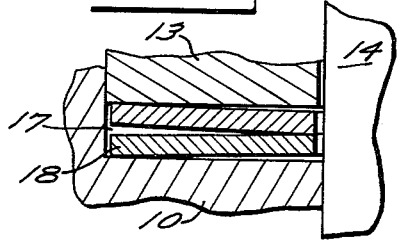
INVENTORS
FRED E. SIMPSON
ROBERT A. FOLKERS
BY
Fryer and Zinnwald
ATTORNEYS

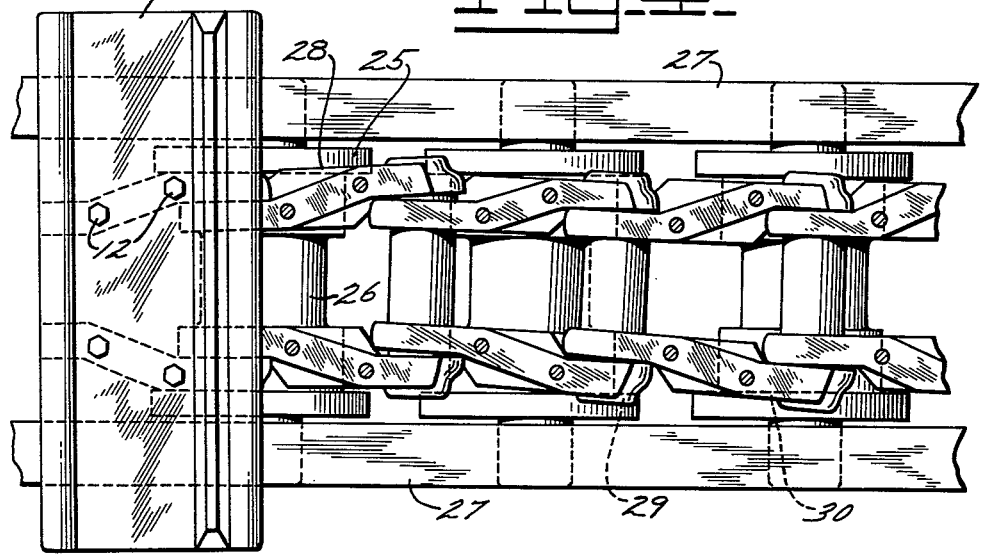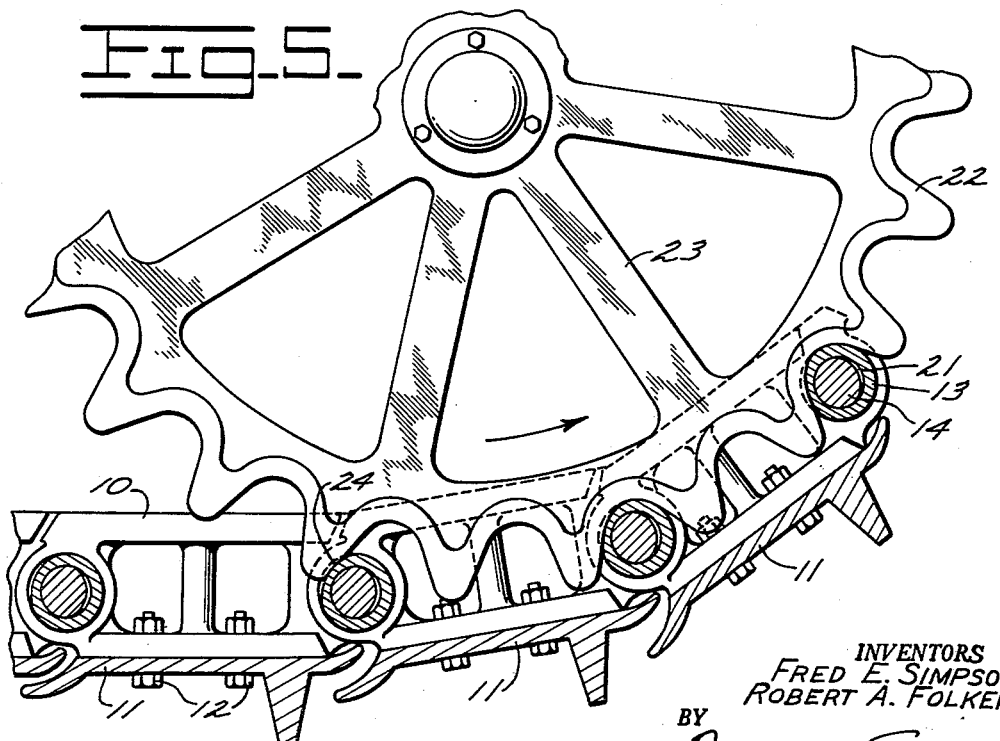

United States Patent Office 3,050,346
Patented Aug. 21, 1962

3,050,346
COMBINED SEAL AND THRUST MEANS
Fred E. Simpson, Washington, and Robert A. Folkers, East Peoria, Ill., assignors to Caterpillar Tractor Co., Peoria, Ill., a corporation of California
Filed Jan. 24, 1961, Ser. No. 84,676
5 Claims. (Cl. 305—11)

This invention relates to an improved hinge connection and more particularly to improved sealing and thrust means for such a connection.

The present invention will have many applications but it is especially useful for and will be disclosed herein as applied to the hinged joints of an endless track mechanism of the type commonly employed on track-type tractors. In a track-type tractor the endless track mechanism comprises a plurality of ground engaging track shoes each of which is secured to a pair of spaced track links pivotally connected to adjacent pairs of track links to form an endless chain. The track chain is trained about suitable guiding rollers and a driving sprocket to provide a rail surface upon which the supporting track rollers ride. The track mechanism is subjected to extremely heavy duty in an environment of a particularly abrasive nature and as a result the hinge connections between pairs of track links are subject to rapid wear requiring frequent repair or replacement.

This wear is principally of two kinds. In one case, the hinge or track pins and the bushings which surround them and are engaged by the sprocket teeth become worn on one side and out of round. This causes looseness and effective lengthening of the track with a resulting loss of pitch between the track joints and the teeth of the driving sprocket and wear of the track components is accelerated by interference and scuffing particularly between the bushings and sprocket teeth. Another disadvantage caused by this type of wear, which lengthens the track causing slackness, is that it requires frequent checking and adjusting of the track tensioning devices of the tractor and sometimes exceeds the capacity of the tensioning devices. In the latter case, the track must be disassembled to rotate or replace the worn pins and bushing.

The other kind of wear referred to occurs at the ends of the track bushings and the track links where they receive thrust loads as for example when a tractor is operating on a side hill. This wear permits erratic lateral shifting or "snaking" of the track, particularly if it is slack, and permits the track links to ride upon the roller rims greatly increasing the rate of wear of both of these components.

It is the object of the present invention to provide a combined seal and thrust means which greatly reduces both kinds of wear of track or chain components described above and thereby extends the useful life of the track.

Further and more specific objects and advantages of the invention and the manner in which it is carried into practice are made apparent in the following specification wherein reference is made to the accompanying drawings.

In the drawings:

FIG. 1 is a plan view of a pair of track links connected by pins and bushings with adjoining pairs of links, fragments of which are shown with portions in section and illustrating the combined seal and thrust members of the present invention;

FIG. 2 is a perspective view of one of the components of the seals shown in FIG. 1;

FIG. 3 is an enlarged fragmentary cross sectional view taken through one of the seals;

FIG. 4 is a plan view of a portion of a track with all but one track shoe removed and showing the truck frame and track rollers behind the track; and FIG. 5 is a fragmentary view in elevation and with parts in section of a portion of a track and a sprocket driving the same.

In FIG. 1 of the drawings, a portion of the endless track mechanism for a track-type tractor is illustrated as comprising a pair of track links 10 to which is secured a track shoe 11 as shown in FIG. 4 by bolts illustrated at 12. At one end the pair of links 10 is pressed on to a bushing 13 having an axial bore for the reception of a pin 14 forming a pivotal connection with the overlapping ends of the adjacent pair of links, portions of which are shown at 10a. The overlapping ends of all of the links are provided with bosses 16 which are bored for reception of the extending ends of the pins 14 which are pressed into the bores. The fit between the bushing 13 and pin 14 is sufficiently loose to permit hinging of the connected track parts as the track passes around the driving sprocket and idler wheels of the tractor (not shown). The inner face of each link adjacent the boss 16 is provided with an annular recess 17 for the reception of the combined seal and thrust means of the present invention herein illustrated as a pair of frusto-conical spring washers 18, one of which is also illustrated in FIG. 2, and generally known as Belleville springs.

In assembly, these spring washers 18 are placed in their unstressed position, as illustrated at the left hand side of FIG. 1, embracing the pin 14 in pairs adjacent each end of the bushing 13 and the adjacent links 10a are then pressed into positions shown at the right side of FIG. 1 compressing the washers 18 to a flat face-to-face position with respect to each other as well as with respect to the ends of the bushings 13 and the innermost annular wall of the space 17. The frusto-conical spring washers 18 are of harder material than either the track links or track bushings and because of their inherent resiliency, they are in tighter engagement with each other adjacent their inner peripheries and in tighter engagement with the inner end of the recess 17 and the outer end of the bushing 13 adjacent their outer peripheries. This is schematically illustrated in FIG. 3 wherein a space between the outer peripheries of the washers represents the area where they are not urged into engagement by virtue of their resiliency and space between the inner peripheries of the washers and the bushing and recess 17 indicates lack of resilient compression. As a matter of fact after a short period of wearing in, some space in the nature of one or two thousandths of an inch might exist in these areas. The result is, however, that as oscillation takes place between adjacent track links or in other words between the boss 16 of one track link and the bushing 13 which is pressed into the other track link, the washers 18 will be oscillated relative to each other because of the driving force of the bushing 13 against the outer periphery of one washer and the driving force of the link 10 against the outer periphery of the other washer. Thus a seal is formed between the inner marginal face-to-face portions of the two washers which inhibits the entry of abrasive material to the area of the relatively rotating surfaces of the bushing 13 and track pin 14. Abrasive material in this area causes rapid wear which reduces the size of the pin 14 as indicated by the broken line 20 in FIG. 1 thus creating a loose fit and space such as shown at 21 in FIG. 5. This space causes an effective lengthening or slacking of the track so that the bushings 13 which are intended to register between teeth 22 of the sprocket 23 no longer properly register but scuff on the sprocket teeth causing rapid wear of the teeth as well as the bushings as illustrated at 24 in FIG. 5.

The fact that the two hard steel washers are compressed to substantially flat positions between the ends of the bushings 13 and the innermost faces of the recesses 17 prevents any substantial lateral shifting movement of the bushings in the recesses 17 and consequently lateral shifting movement or "snaking" of the track in operations where lateral forces are encountered. Wear of the ends of the bushings and the inner faces of the recesses 17 which would permit such lateral shifting is also eliminated because the washers 18 do not rotate relative to the bushing and the recess. All tendency toward wear in this area is between the hard faces of the washers 18 and is greatly minimized because of their hardness and the inability of abrasive materials to enter between their contacting surfaces. Because of this arrangement, the present construction is superior to seals employed in this locality which are formed of soft easily compressible material such as rubber or the like which permits lateral shifting and leads to the type of wear of track components which is illustrated in FIG. 4 wherein the track links are shown as crowding or riding upon the flanges 25 of track rollers 26 which are rotatably supported between truck frames 27. The areas of wear of the track links as well as the track rollers are indicated in dotted lines at 28, 29 and 30 as resulting from this undesirable lateral shifting of the track.

We claim:

1. A combined seal and thrust means for disposition in an annular recess between relatively rotating parts which consists essentially of two frusto-conical spring washers fitting within said recess and deflected toward flat face-to-face contact therein by forcing one of said parts toward the other.

2. A combined seal and thrust means for disposition in an annular recess between relatively rotating parts which consists essentially of two frusto-conical spring washers fitting within said recess and deflected toward flat face-to-face contact therein by forcing one of said parts toward the other with the inner margins of said washers in contact with each other and their outer margins separated prior to the application of the deflecting force.

3. A hinge connection comprising two parts connected for relative swinging movement by a pin, one of said parts having an annular recess concentric to the pin, an annular projection on said other part fitting into said recess, and a pair of frusto-conical spring washers in said recess arranged to be deflected toward flat face-to-face contact whereby they will form a seal against material entering through said recess and a thrust element preventing relative lateral shifting of said parts.

4. In a hinge connection between two links of a tractor track or the like having a pin and a bushing rotatable thereon and in which one link is tightly fitted on the pin and the other on the bushing, a seal to prevent entry of foreign matter toward the relatively rotatable surfaces between the bushing and the pin which consists essentially of a pair of frusto-conical spring washers between the end of the bushing and the link which is fitted to the pin, said last link and bushing being sufficiently closely spaced to deflect said washers to a substantially flat condition.

5. In a hinge connection between two links of a tractor track or the like having a pin and a bushing rotatable thereon and in which one link is tightly fitted on the pin and the other on the bushing, a seal to prevent entry of foreign matter toward the relatively rotatable surfaces between the bushing and the pin which comprises a frusto-conical spring washer embracing the pin with its outer marginal edge in contact with the bushing, and a similar washer embracing the pin with its outer marginal edge in contact with the link on the pin, said last link being assembled on the pin sufficiently close to the bushing to compress said washers to substantially flat face-to-face positions.

References Cited in the file of this patent

UNITED STATES PATENTS

| 2,015,683 | Knox et al. | Oct. 1, 1935 |
| 2,376,864 | Eberhard | May 29, 1945 |
| 2,906,562 | Burgman | Sept. 29, 1959 |
| 2,911,840 | Muller et al. | Nov. 10, 1959 |

FOREIGN PATENTS

| 500,476 | Germany | June 21, 1930 |
| 825,298 | France | Dec. 8, 1937 |